Oct. 14, 1952 — F. J. EICHELMAN — 2,613,481
PRESSURE REGULATING VALVE
Filed Aug. 1, 1947

A — CROSS SECTIONAL AREA OF NOZZLE BORE
B — CROSS SECTIONAL AREA OF PASSAGEWAY
C — CROSS SECTIONAL AREA OF INSERT

AREA

DISTANCE

INVENTOR.
Frank J. Eichelman
BY
Dean Fairbank & Hirsch
ATTORNEYS

Patented Oct. 14, 1952

2,613,481

UNITED STATES PATENT OFFICE 2,613,481

PRESSURE REGULATING VALVE

Frank J. Eichelman, Brookfield, Ill., assignor to National Cylinder Gas Company, Chicago, Ill., a corporation of Delaware Application August 1, 1947, Serial No. 765,359

5 Claims. (Cl. 50—23)

This invention relates to fluid pressure regulators of the type in which the high pressure gas or other fluid flows through a nozzle into a chamber having one wall formed by a diaphragm which is provided with some control means for stopping the flow of gas through the nozzle into said chamber when the pressure in the chamber and acting on the diaphragm reaches some preselected amount. In common practice the control means operated by the diaphragm is a valve disc of resilient material, and often of a combustible nature, particularly when heated to a high temperature in the presence of oxygen.

With the regulator in use, the gas in the chamber flows to the place of use, and under the pressure determined by the setting of the regulator, the diaphragm holds the valve disc away from the nozzle to such a distance that gas may continuously flow from the nozzle at the rate at which it is withdrawn from the regulator, and the pressure in the chamber of the regulator remains substantially constant. While the gas is being used at a substantial rate the flow through the nozzle is at rather high velocity, and each time the flow of gas from the chamber is stopped the pressure in the chamber almost instantly builds up and the diaphragm instantly forces the valve disc against the end of the nozzle. Each time this occurs the velocity of the gas flow in the nozzle causes the gas pressure in the nozzle to substantially increase. This sudden increase in pressure raises the temperature of the gas adjacent to the valve disc and heats the latter as well as the body of the nozzle against which the valve disc is pressed. Such heating of the disc causes its gradual deterioration, and if the gas be oxygen and the disc be of rubber or other combustible material, there is liability of its catching fire, and such fire in an atmosphere of oxygen injures or may even melt the nozzle.

This danger has long been recognized and many attempts have been made to reduce or eliminate it, as for instance by providing means intended to dissipate the heat produced in the nozzle at the time of sudden closing of the disc against it. The Messer Patent 1,514,217 and the Ricker Patent 1,825,637 illustrate two of the constructions heretofore proposed. The central stems shown in the nozzles of those patents became heated by the compression of the gas, but have very limited contact with the nozzle or other part whereby such heat may be dissipated.

The main object of my invention is to secure a rapid and effective conduction of the heat resulting from gas compression, to the body of the regulator and away from the seat, so that danger of overheating the valve disc is effectively averted.

In carrying out my invention I provide a heat conducting member having large surface area for contact with the gas, thereby to absorb heat from it without impeding the flow, and at the same time having extensive contact with the wall of the nozzle for conduction of the heat to the nozzle throughout substantially the full length of the latter. Thus the heat suddenly generated by the rapid closing of the nozzle outlet is absorbed and dissipated.

In carrying out my invention the nozzle is provided with a partition extending lengthwise, and preferably throughout the major portion of the length of the nozzle. As one important feature the side edges of the partition or blade directly contact with the inner surface of the nozzle wall throughout the major portion of the length thereof, so as to give effective heat transfer.

As a further feature, the helical twist of the partition somewhat retards the flow of gas and increases its turbulence, and thus improves heat transfer to the nozzle wall and to the partition. Heat transfer is also increased by the fact that the length of the helical path of the gas and of the edges of the partition in contact with the wall of the nozzle are greater than the length of the nozzle in contact with the partition.

As a further feature the partition is of reduced width and preferably comes to a point disposed closely adjacent to but spaced from the seat, so that the heat of gas compression absorbed by the partition cannot be directly transferred to the seat.

As a further feature the passage through the nozzle converges somewhat adjacent to the seat, but to a lesser extent than the converging of the side edges of the partition, so that the effective cross-sectional area of the passage throughout the major portion of the length of the nozzle increases adjacent to the delivery end to decrease the velocity of flow adjacent to the seat and lessen the heat of recompression due to the slight expansion of the gas in the nozzle and closely adjacent to the seat. The termination of the partition above the seat does not result in any increase in the volume of gas contacting the seat.

In the accompanying drawings one embodiment of my invention is illustrated. In these drawings.

Figure 1:
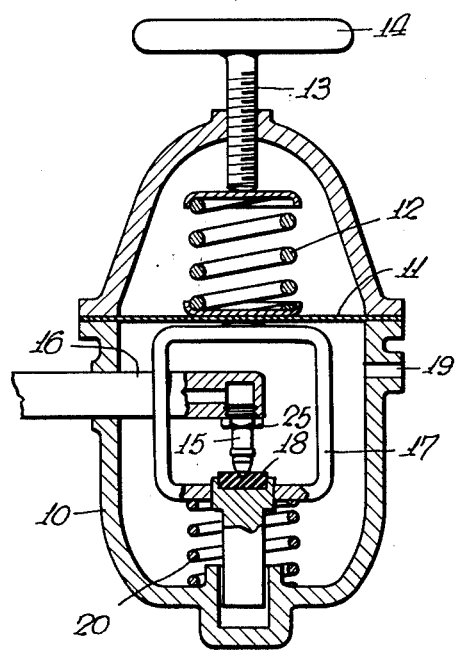
Fig. 1 is a central longitudinal section of a common type of regulator modified to embody my invention.
Figure 2:
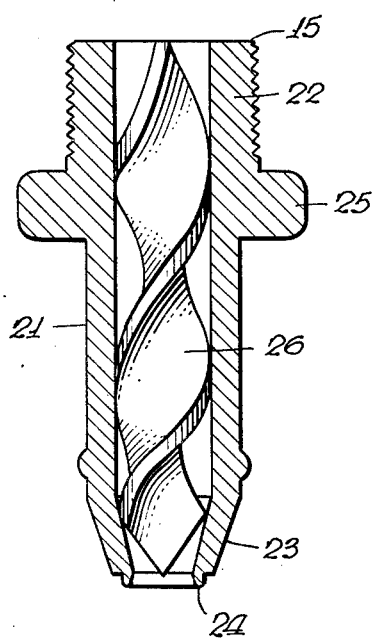
Fig. 2 is an enlarged longitudinal section through the nozzle, and showing the inserted heat dissipating member in side elevation.

The regulator illustrated is a common and well known type, and includes a casing 10 closed at one side by a diaphragm 11 which is pressed in by a spring 12 and an adjusting screw 13 having a handle 14. Projecting into the chamber of the casing 10, and at the opposite side of the diaphragm, is a nozzle 15 on a pipe 16 for the delivery of high pressure gas, and with its outlet facing away from the diaphragm. Connected to the diaphragm is a yoke 17 carrying a nozzle closing disc or seat 18, and at one side of the casing is an outlet connection 19 for the hose or the like conducting the low pressure gas to the place of use, where there is some type of flow control or shut-off valve. The yoke may be guided in a suitable bracket or socket and urged toward the diaphragm by spring 20. To the extent referred to, all of these parts except the nozzle may be designed in accordance with standard practice, and involve no novel features of my invention.

In carrying out my invention the nozzle 15 has a cylindrical body portion 21 which may be threaded or otherwise formed at one end 22 for the detachable engagement with the high pressure supply pipe 16, and preferably has a frustro-conical outlet end portion 23 terminating in an annular seating flange 24. Adjacent to the threaded end 22 the nozzle preferably has a non-circular flange 25 which may be engaged by a wrench or other tool to facilitate the screwing of the nozzle into the pipe 16.

Within the nozzle and preferably extending substantially the full length thereof, is an insert in the form of a blade or partition 26 of uniform width throughout the major portion of the length, and corresponding to the inside diameter of the body portion 21 of the nozzle. The insert, partition or blade has a helical twist of rather low pitch, for instance with one complete turn in a distance equal to about four times the inside diameter of the bore through the body of the nozzle, and the pitch may, if desired, become progressively steeper from one end toward the other end of the nozzle. The bore at the outlet end preferably flares slightly.

The blade at the delivery or conical end of the nozzle is tapered, but at a steeper angle than that of the conical portion of the body of the nozzle, and comes to a point at the center of the outlet end of the nozzle. This blade serves several purposes.

It leaves the outlet end of the nozzle free and unrestricted to insure a free flow outward radially around the circumference of the seating flange 24 when the latter is spaced from the seat.

It prevents any substantial contact of the blade with the seat, even though the latter becomes worn and the seating flange 24 enters into the worn groove in the seat.

It provides for a progressive decrease in the cross-sectional area in the passage toward the outlet end of the nozzle, and at a lower rate than would be effected by the conical section of the nozzle alone.

It provides a cross-sectional area at the nozzle outlet greater than the cross-sectional area just behind the outlet of the nozzle, and where the insert terminates. This permits for slight expansion of the gas and gives greater cross-sectional area for heat transfer to other parts of the nozzle.

Figure 4:
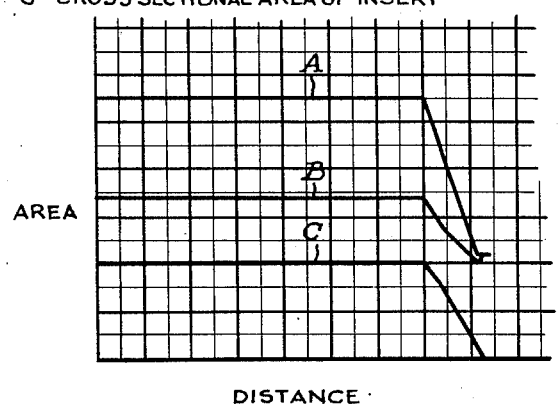
Fig. 4 is a graph showing the relative cross-sectional areas along the length of the nozzle.
Figure 3:
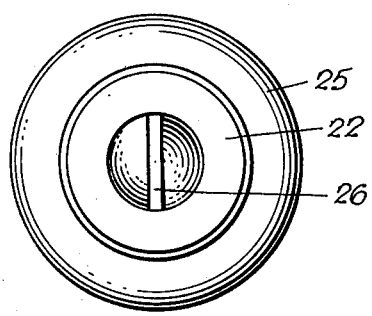
Fig. 3 is an end view of the nozzle and insert.

The graph (Fig. 4) shows the different cross-sectional areas along the length of the nozzle, by the lines A, B and C and their respective spacings from the base line. It will be noted that these lines are parallel along the length of the body of the nozzle, and that the lines A and C representing the area of the nozzle bore and the area of the nozzle insert, respectively, converge in the conical part of the nozzle. The spacing between the right hand end of the line C, representing the area of the nozzle insert, and the line B representing the total area of the passageway, increases at the end of the conical portion of the nozzle by reason of the fact that the insert comes to a point.

In operation, the gas flows rapidly and helically along the blade, but as the blade comes to a point the cross-sectional area of the passage along the pointed end section of the blade does not decrease as rapidly as it would if the insert tapered at the same angle as the bore and followed the wall to the outlet. When the valve seat is suddenly forced into contact with the end of the nozzle and the gas flow through the nozzle is stopped, the gas will be compressed in the nozzle adjacent to the seat, and this sudden compression causes the generation of a substantial amount of heat, but the increased area at the end of the nozzle due to the slight flare, lessens the force and the heat of recompression through a slight expansion of the gas. This heat is absorbed from the periphery of the body of the gas into the nozzle, but a far larger portion of the heat is absorbed by the blade and conducted directly to the nozzle, by reason of the close contact of the edges of the blade with the nozzle wall. Thus the gas has its heat abstracted not merely from the periphery, but from throughout the body. This heat, being conducted to the nozzle body, is rapidly dissipated by the contact of the nozzle with the body structure of the regulator. Furthermore, upon the sudden stopping of the flow, there will be less heat generated in the portion of the gas directly adjacent to the seat than in the portion of the gas a little farther back in the nozzle.

By reason of my improved construction there is practically no liability of the seat catching fire, even if of combustible material, and the amount of heat generated directly at the seat is far less than in any other construction with which I am familiar.

Having thus described my invention what I claim as new and desire to secure by Letters Patent is:

1. A fluid pressure regulator of the type in which there is provided a nozzle and a heat vulnerable valve seat, said nozzle and seat being relatively movable to control the flow of fluid from said nozzle, said nozzle having a helical twisted blade the terminal portion of which has inclined edges disposed therein and extending lengthwise thereof in heat conducting relation with its wall, and terminating out of contact with and above said seat.

2. A fluid pressure regulator of the type in which there is provided a nozzle and a heat vulnerable valve seat, said nozzle and seat being relatively movable to control the flow of fluid from said nozzle, said nozzle having a helical twisted blade disposed therein and extending lengthwise thereof in heat conducting relation with its wall, and having a terminal portion tapering to a point adjacent to but spaced from said seat.

3. A fluid pressure regulator of the type in which there is provided a nozzle and a heat vulnerable valve seat, said nozzle and seat being relatively movable to control the flow of fluid from said nozzle, said nozzle having a converging delivery end portion and a partition disposed therein and extending lengthwise of said nozzle in heat conducting relation with its wall, and having an end portion converging to a greater extent than the converging end portion of the nozzle.

4. A fluid pressure regulator of the type in which there is provided a nozzle and a heat vulnerable valve seat, said nozzle and seat being relatively movable to control the flow of fluid from said nozzle, said nozzle having a partition therein extending lengthwise thereof and having helical edges in heat conducting contact with the wall of the nozzle, the terminal portion of said nozzle being conical and the terminal portion of said partition having edge portions converging at a sharper angle than that of the nozzle.

5. In a fluid pressure regulator having a high pressure inlet passageway leading to a valve formed between a nozzle and a heat vulnerable valve seat cooperating therewith to control the flow of fluid from said nozzle, a partition extending generally lengthwise of at least a portion of said high pressure inlet passageway in advance of said valve and which has its edges in heat conducting contact with the walls of said passageway, and the terminal portion of which has converging edges terminating above and out of contact with said seat.

FRANK J. EICHELMAN.

REFERENCES CITED

The following references are of record in the file of this patent:

UNITED STATES PATENTS

| Number | Name | Date |
| --- | --- | --- |
| 1,038,262 | Anstice | Sept. 10, 1912 |
| 1,514,217 | Messer | Nov. 4, 1924 |
| 1,743,989 | Wainwright | Jan. 14, 1930 |
| 1,759,081 | Anderson | May 20, 1930 |
| 1,825,637 | Ricker | Sept. 29, 1931 |
| 1,989,340 | Shepherd | Jan. 29, 1935 |